(12) United States Patent
Finlay

(10) Patent No.: US 8,457,133 B2
(45) Date of Patent: Jun. 4, 2013

(54) LOAD BALANCING IN CORE NETWORK COMPRISING A POOL OF CORE NETWORK ELEMENTS

(75) Inventor: Roy Finlay, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 141 days.

(21) Appl. No.: 12/739,617

(22) PCT Filed: Oct. 29, 2007

(86) PCT No.: PCT/EP2007/061605
§ 371 (c)(1),
(2), (4) Date: Oct. 31, 2010

(87) PCT Pub. No.: WO2009/056164
PCT Pub. Date: May 7, 2009

(65) Prior Publication Data
US 2011/0032820 A1    Feb. 10, 2011

(51) Int. Cl.
*H04L 12/28* (2006.01)
*H04L 12/56* (2006.01)
*H04J 3/16* (2006.01)
*H04J 3/22* (2006.01)

(52) U.S. Cl.
USPC ......................... 370/395.4; 370/465

(58) Field of Classification Search
None
See application file for complete search history.

(56) References Cited

U.S. PATENT DOCUMENTS

| 6,129,604 | A | 10/2000 | Maveddat et al. |
| 6,567,415 | B1 * | 5/2003 | Elwalid et al. ............... 370/412 |
| 8,315,634 | B2 * | 11/2012 | Gustavsson .................. 455/445 |
| 2007/0111734 | A1 | 5/2007 | Beppu et al. |

FOREIGN PATENT DOCUMENTS

| EP | 1 282 321 A | 2/2003 |
| WO | 2006/133630 A | 12/2006 |

OTHER PUBLICATIONS

PCT International Search Report, dated Sep. 5, 2008, in connection with International Application No. PCT/EP2007/061605.
ETSI Technical Specification TS 123 236, V7.0.0 Digital cellular telecommunications system (Phase 2+); Universal Mobile Telecommunications System (UMTS); Intra-domain connection of Radio Access Network (RAN) nodes to multiple Core Network (CN) nodes (3GPP TS 23.236 version 7.0.0 Release 7), Jun. 2007.
3GPP Technical Specification TS 23.236, V6.3.0 Technical Specification Group Services and System Aspects; Intra-domain connection of Radio Access Network (RAN) nodes to multiple Core Network (CN) nodes (Release 6), Mar. 2006.

* cited by examiner

*Primary Examiner* — Xavier Szewai Wong
(74) *Attorney, Agent, or Firm* — Potomac Patent Group PLLC

(57) ABSTRACT

A method of balancing load of an individual network element operating in a pool in a radio telecommunications network. In said network a user equipment is assigned to a network element from said pool of network elements based on relative weighting values associated with said network elements. Said relative weighting value indicates the capacity of a network element relative to other network elements in the pool. The method comprises: periodically determining load of said network element; reducing the relative weighting value if said network element is overloaded for a predefined number of periods, exceeding a limit of allowed consecutive overloads.

22 Claims, 8 Drawing Sheets

LOAD BALANCING IN CORE NETWORK COMPRISING A POOL OF CORE NETWORK ELEMENTS

TECHNICAL FIELD

The present invention relates to a core network controlling a radio telecommunications network, in general, and in particular to a network element, network management system and a method of balancing load of network elements operating in a pool.

BACKGROUND

Mobile Switching Centre, MSC, in pool is a concept whereby a Radio Access Network node (RAN node), which can be for example RNC (Radio Network Controller) or BSC (Base Stations Controller) is controlled by a pool of MSCs. This is intended to provide more flexibility in extending a mobile core network with additional MSCs, reduction in signaling in the core network and network redundancy. In such configuration if one MSC in the pool experiences a system failure the RAN nodes continue to be controlled by the remaining MSCs in the pool. Without MSC in pool a RAN node may only be controlled by a single MSC and a failure of this MSC results in disruption of services provided to subscribers served by the affected RAN nodes.

FIG. 1 illustrates a telecommunications network 100, in which MSCs are organized in pools. Pool 1 consists of MSC 1, MSC 2 and MSC 3. It controls all the RAN nodes (these may be BSCs or RNCs) in pool area 1—RAN node 1, node 2, node 5 and node 6. Pool 2 consists of MSC 4, MSC 5 and MSC 6 and it controls all the RAN nodes in pool area 2, i.e. is RAN node 3 and node 7. MSC 7 is not in any pool and it is the only MSC controlling RAN node 4 and node 8. When a mobile subscriber moves into the pool area controlled by the MSC pool the RAN node decides which MSC to send the registration request to.

If an MSC in pool 1, for example MSC 2, experiences a complete failure the remaining MSCs in pool 1, i.e. MSC 1 and MSC 3, will continue to control all the RAN nodes in pool areal thus avoiding loss of service to the mobile subscribers server by the RAN nodes in pool area 1.

3GPP does not specify a particular method for load balancing. However a typical situation is that a relative weighting is assigned to each MSC in the pool. Non Access Stratum (NAS) Node Selection Function in a RAN Node will allocate subscribers to an MSC in the pool on the basis of this weighting.

Overload may occur due to geographical factors such as presence of major roads and commuter patterns, MSCs managing RAN Nodes which are outside of the pool area as well as due to the number of RAN nodes in the pool area and processing capacity of the MSC.

The example given above is applicable not only to Mobile Switching Centres operating in a pool, but also to Serving GPRS Support Nodes operating in a pool.

SUMMARY

It is the object of the present invention to obviate at least some of the above disadvantages and provide an improved balancing of traffic load, which results in more even distribution of the load among the network elements (MSCs and SGSNs) and which can dynamically adjust priorities in assigning subscribers to network elements in a pool.

Accordingly, the invention seeks to preferably mitigate, alleviate or eliminate one or more of the disadvantages mentioned above singly or in any combination.

According to a first aspect of the present invention there is provided a method of balancing load of an individual network element operating in a pool in a core network. The network comprises at least one pool of at least two network elements and a plurality of Radio Access Network nodes controlled by said network elements. User equipment is assigned to a network element from said pool of network elements based on relative weighting values associated with said network elements. The method comprises: periodically determining load of said network element; reducing the relative weighting value if said network element is overloaded for a number of periods exceeding a limit of allowed consecutive overloads.

According to a second aspect of the present invention there is provided a network element operating in a pool of at least two network elements in a core network. Said network element is adapted to control a plurality of Radio Access Network nodes and has associated a relative weighting value. The network element comprises means for periodic determining its traffic load, a memory unit and also comprises a control unit for comparing the traffic load with an upper limit stored in said memory and a first counter for recording number of consecutive occasions of exceeding the upper limit. Said control unit is adapted to reduce the relative weighting value if said network element is overloaded for a number of periods exceeding a limit of allowed overloads.

According to a third aspect of the present invention there is provided a core network controlling a radio telecommunications network comprising at least one pool of at least two network elements and a plurality of Radio Access Network nodes controlled by said network elements. Balancing of traffic load of an individual network element operating in the pool is carried out in accordance with the method of the first aspect of the present invention.

According to a fourth aspect of the present invention there is provided a network management system for control of a core network. Said core network comprising a plurality of network elements operating in a pool of at least two network elements, wherein an individual network element is adapted to control a plurality of Radio Access Network nodes. Said individual network element has associated a relative weighting value stored in said network management system. The network management system comprises means for periodic determining traffic load of individual network elements, a memory unit, and a control unit for comparing the traffic load of said individual network element with an upper limit stored in said memory. The network management system further comprises a first counter for recording a number of consecutive occasions of exceeding the upper limit. Said control unit is adapted to reduce the relative weighting value if said network element is overloaded for a number of periods exceeding a limit of allowed consecutive overloads.

Further features of the present invention are as claimed in the dependent claims.

The present invention provides the benefit of dynamic control of balancing the traffic load, which results in more even distribution of the load and prevents increasing traffic load of some network elements close to or above certain limits if at the same time other network elements in its pool are underloaded. It helps preventing overload situations and dropped calls.

BRIEF DESCRIPTION OF THE DRAWINGS

The present invention will be understood and appreciated more fully from the following detailed description taken in conjunction with the drawings in which.

DETAILED DESCRIPTION

The present invention is discussed herein below in the context of Mobile Switching Centres, MSCs, operating in a pool. However, it should be understood that it is not limited to Mobile Switching Centres, but applies also to other network elements that control or support Radio Access Network nodes, for example Serving GPRS Support Nodes, SGSNs. Therefore the description of embodiments of the invention given below in the context of MSC is equally applicable to SGSN.

The relative weighting indicates capacity of an MSC relative to the other MSCs in a pool. This value is configured on the RAN node for each MSC in the pool which controls the RAN node. The RAN node allocates subscriber (or user equipment) registration requests to an MSC based on its relative weighting with the pool. All RAN nodes controlled by the MSC pool use the same relative weighting value for a given MSC. In this approach probability that a subscriber (user equipment) will be allocated to $MSC_x$ is determined by the following equation:

$$P_x = \frac{W_x}{W_1 + W_2 + \ldots + W_n}$$

where $W_x$ is the relative weighting of $MSC_x$ in the pool (specified in one embodiment as an integer value between 0 and 100, where 0 means than no subscribers will be assigned to the MSC);

n is the number of MSCs in the pool and must be $\geq 2$ for adaptive control to be applied;

$P_x$ is the probability that a subscriber will be allocated to MSC x.

Adaptive control of MSC relative weighting for MSCs in a Pool as presented in the present invention provides a form of traffic management for a pool of MSCs. The traffic load on each MSC in the pool is measured at regular intervals on an ongoing basis. An upper limit parameter is specified to identify what constitutes an excessive traffic load for an MSC and how often should an excessive traffic load be allowed to occur before controls are activated and by how much the relative weighting of an MSC should be reduced when the adaptive controls are activated.

Preferably a lower limit is also specified such that when an overload situation occurs in one or more of the MSCs in a pool, if another MSC in the pool has traffic load below this limit it is considered to be underloaded. A further parameter specifies by how much the relative weighting for the underloaded MSC shall be increased.

Figure 1:
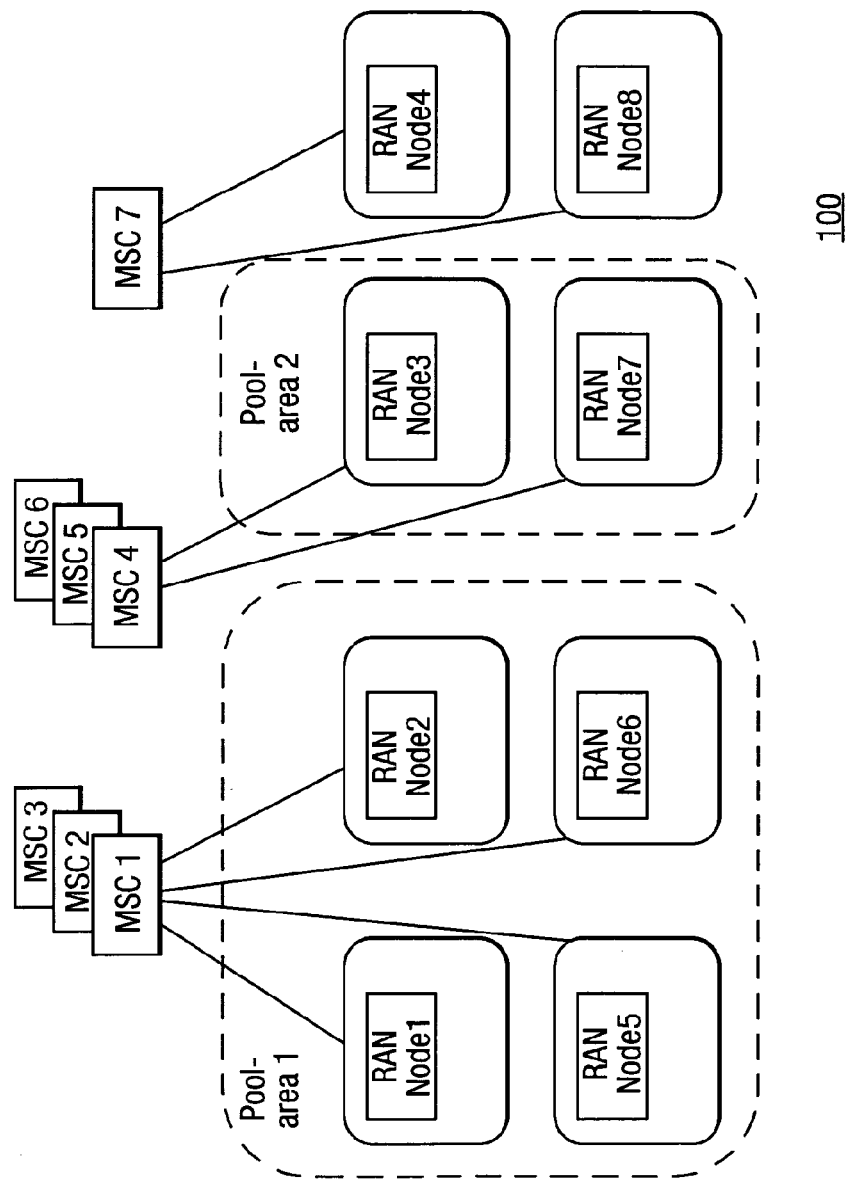
FIG. 1 illustrates a telecommunications network known in the art.
Figure 2:
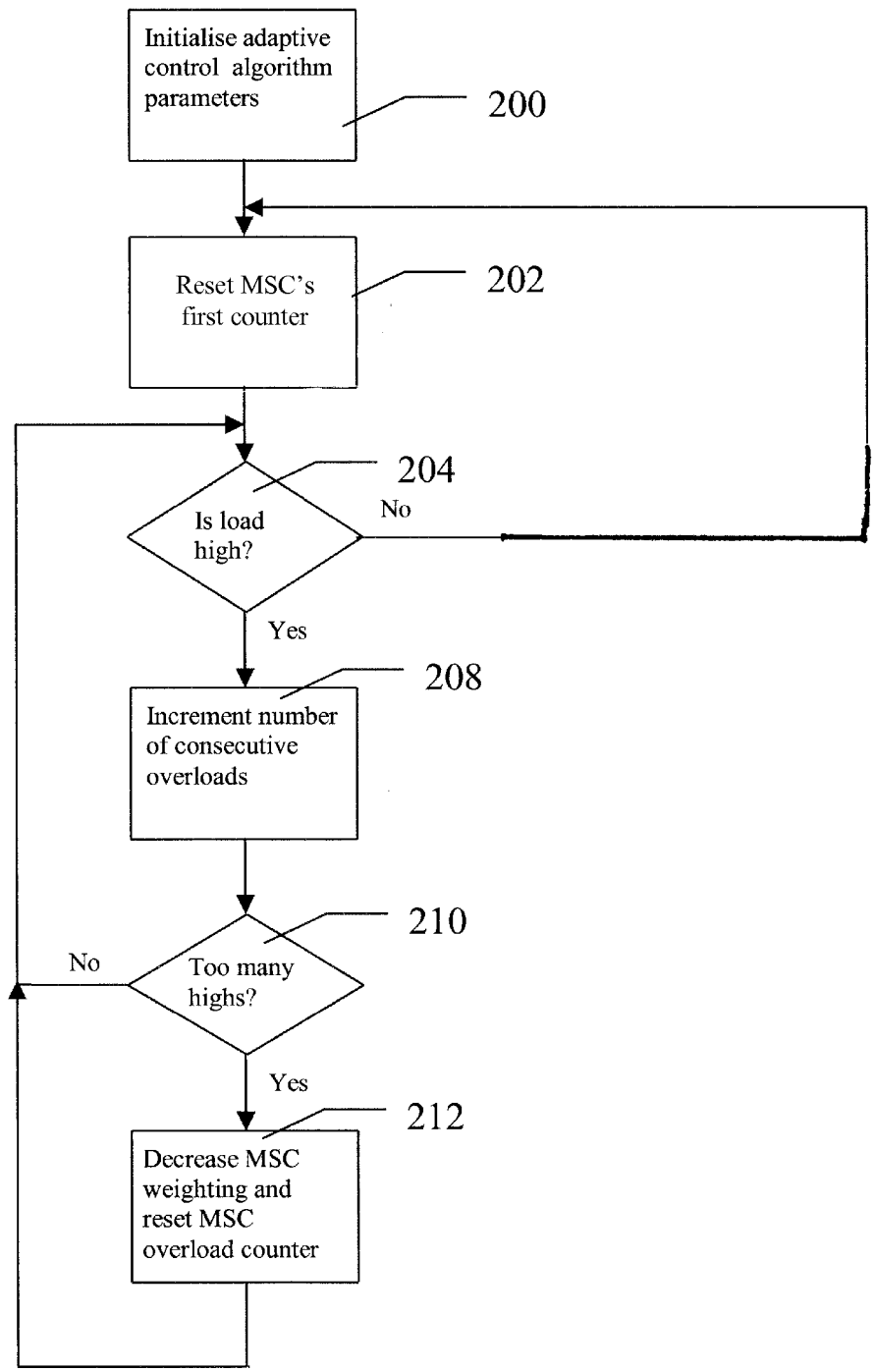
FIG. 2 is a flowchart illustrating a method of balancing load of an individual network element in one embodiment of the present invention.
Figure 3:
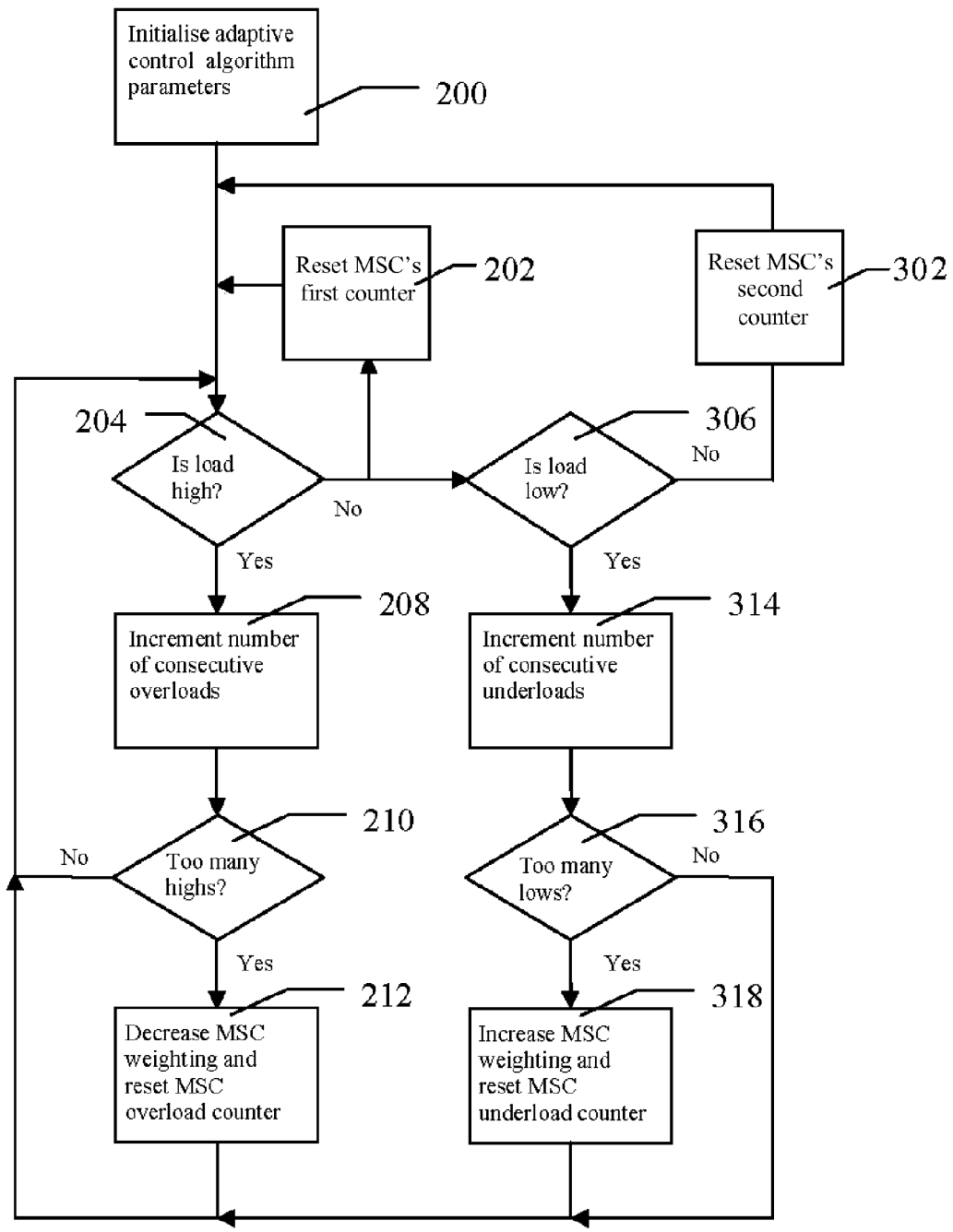
FIG. 3 is a flowchart illustrating a method of balancing load of an individual network element in one embodiment of the present invention.

In one embodiment of the method of adaptive load balancing, illustrated in FIG. 2, an individual MSC in the pool periodically determines its load, 204, 206. If said MSC is overloaded for a predefined number of periods, 210, the relative weighting value assigned to this MSC is reduced 212. Following the equation given above, reduction of relative weighting of a particular MSC causes reduction of probability of assigning a user equipment to this MSC. In this embodiment the method of load balancing deals only with situation of overload of network element in a pool. In a preferred embodiment, as illustrated in FIG. 3 the method also deals with situation of underload by checking if the network element is underloaded. If it is found that said MSC is underloaded for a predefined number of periods 316 the relative weighting value assigned to this MSC is increased 318. Again, from the equation given above it is clear that as a result of this operation the probability of assigning a new user equipment to this MSC will be increased.

Preferably the traffic load of an individual MSC is compared, 204 with an upper limit and if the upper limit is exceeded a first counter is incremented 208. Otherwise said first counter is erased 202. These operations allow keeping track of the number of consecutive overloads. In the next step the first counter is compared, 210, with a limit of allowed consecutive overloads and if said limit of allowed consecutive overloads is exceeded the relative weighting value assigned to this MSC is reduced 212. In one embodiment the limit of allowed consecutive overloads is set to 1, but in alternative embodiments higher values of this limit can be used.

Additionally, if the load is below the upper limit the traffic load assigned to this MSC is compared, 306, with the lower limit. If it is found that the traffic load is below the lower limit a second counter is incremented, 314, and if it is found that the traffic load is above the lower limit (which means that the traffic load is between the lower and upper limits) said second counter is erased 302. If the second counter was increased 314, in the following step the second counter is compared, 316, with a limit of allowed consecutive underloads. If said limit of allowed consecutive underloads is exceeded the relative weighting value is increased 318. In one embodiment the limit of allowed consecutive underloads is set to 1, but in alternative embodiments higher values of this limit can be used.

In operation, each MSC operating in a pool runs an algorithm that implements the method according to embodiments of the present invention. To initialize the algorithm the user must specify the following parameters:

I—the interval between measurement of MSC load in minutes, value range 1-60

$L_u$—the upper limit on traffic load an overloaded MSC which triggers load rebalancing (specified in %)

$L_l$—the lower limit on traffic load on an underloaded MSC (specified in %)

$D_u$—the delta by which the relative weighting of an overloaded MSC shall be reduced (integer with value range 1-10)

$D_l$—the delta by which the relative weighting of an underloaded MSC shall be increased (integer with value range 0-10)

$T_u$—the number of consecutive times the upper limit on traffic load is exceeded for a given MSC to be considered to be overloaded $T_l$—the number of consecutive times the lower limit on traffic load is exceeded for a given MSC to be considered to be overloaded The following variables are used:

load(x)—the traffic load in % for $MSC_x$ timesOver(x)—the number of consecutive occasions when $MSC_x$ has been overloaded timesUnder(x)—the number of consecutive occasions when $MSC_x$ has been underloaded In one embodiment of the present invention the algorithm to control the adaptive load balancing is illustrated in the following pseudo-code:

```
Initialise timesOver(x) and timesUnder(x) for all MSC's to 0.
Repeat until user termination for each MSC:
    If (load(x) > L_u)
        set timesOver(x) = timesOver(x) + 1
        set timesUnder(x) = 0
        If (timesOver(x) >= T_u)
            set W_x = maximum of ( W_x - D_u , 1)
            set timesOver(x) = 0
        Endif
    Else reset timesOver(x) to 0
    Endif
    If (load(x) < L_l)
        set timesUnder(x) = timesUnder(x) + 1
        set timesOver(x) = 0
        If (timesUnder(x) >= T_l)
            set W_x = minimum of (W_x + D_l, 100)
            set timesUnder(x) = 0
        Endif
    Else reset timesUnder(x) to 0
    Endif
```

In one embodiment for each MSC in a pool the algorithm presented above is run until user termination.

The values of relative weighting, time interval, deltas and others given in the embodiment discussed above are examples given only to illustrate the operation of the invention and in many other, alternative, embodiments covered by this invention these values can be different.

Figure 4:
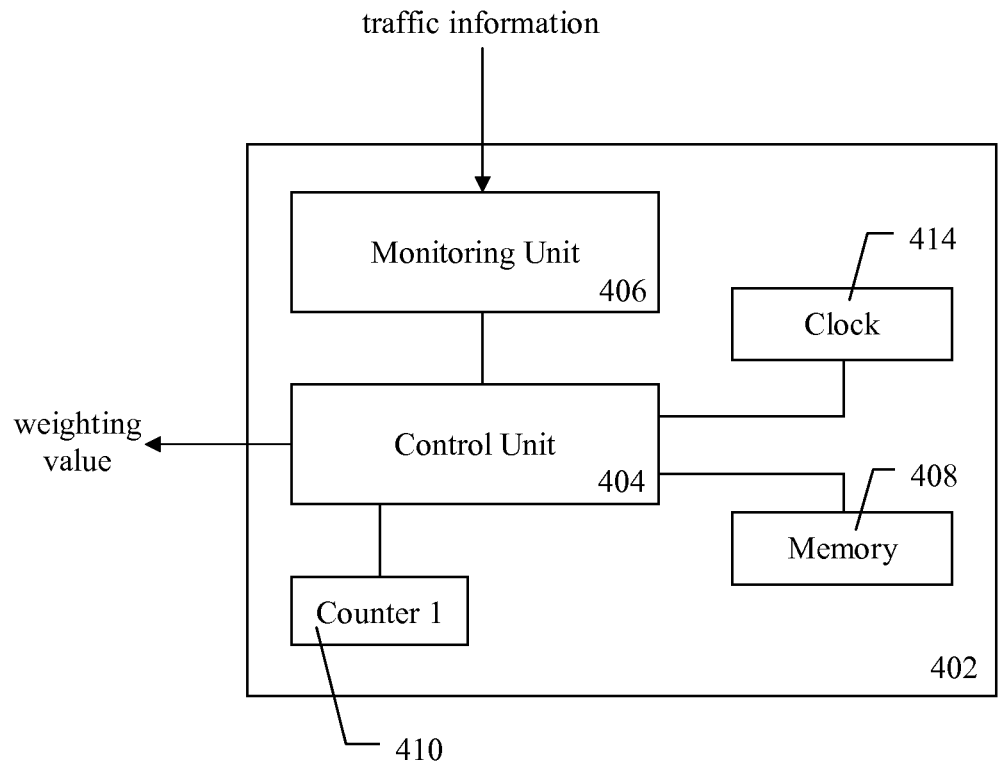
FIG. 4 is a diagram illustrating a network element in one embodiment of the present invention.

FIG. 4 illustrates one embodiment of a MSC, 402. For the sake of clarity, remaining elements of the MSC not essential for the invention are omitted in the drawing.

The Mobile Switching Centre 402 comprises traffic load monitor 406 that periodically determines traffic load processed by the MSC 402. It further comprises a memory unit 408, a control unit 404 for comparing the traffic load with an upper limit stored in said memory 408. A first counter 410 receiving trigger signals from the control unit 404 records the number of consecutive occasions of exceeding the upper limit. Said control unit, 404, reduces a relative weighting value assigned to the MSC, 402, if said MSC, 402, is overloaded for a predefined number of periods (i.e. for a number of periods that exceeds the limit of allowed consecutive overloads).

Figure 5:
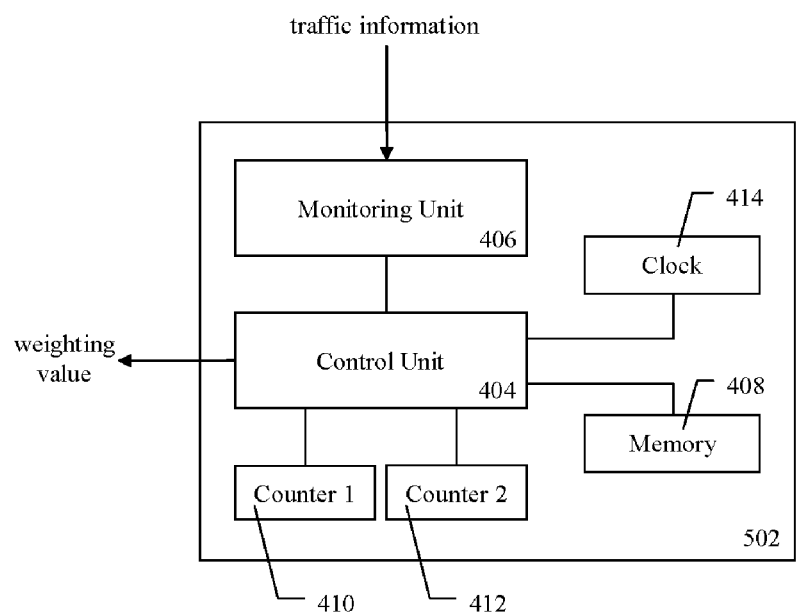
FIG. 5 is a diagram illustrating a network element in a preferred embodiment of the present invention.

In a preferred embodiment illustrated in FIG. 5 the MSC, 502, further comprises a second counter, 412, and said memory 408 stores a value of lower limit of traffic load, wherein the control unit, 404, compares the traffic load with said lower limit. The second counter, 412, records number of consecutive occasions of the traffic load being below the lower limit and said control unit, 404, increases the relative weighting value if said MSC, 402, is underloaded for a predefined number of periods.

The MSC, 402, 502, also comprises a clock, 414, which provides timing signals to the control unit 404 to trigger determination of traffic load of the MSC, 402, 502. In an alternative embodiment the timing signals are received from an external source (e.g. network).

Figure 6A:
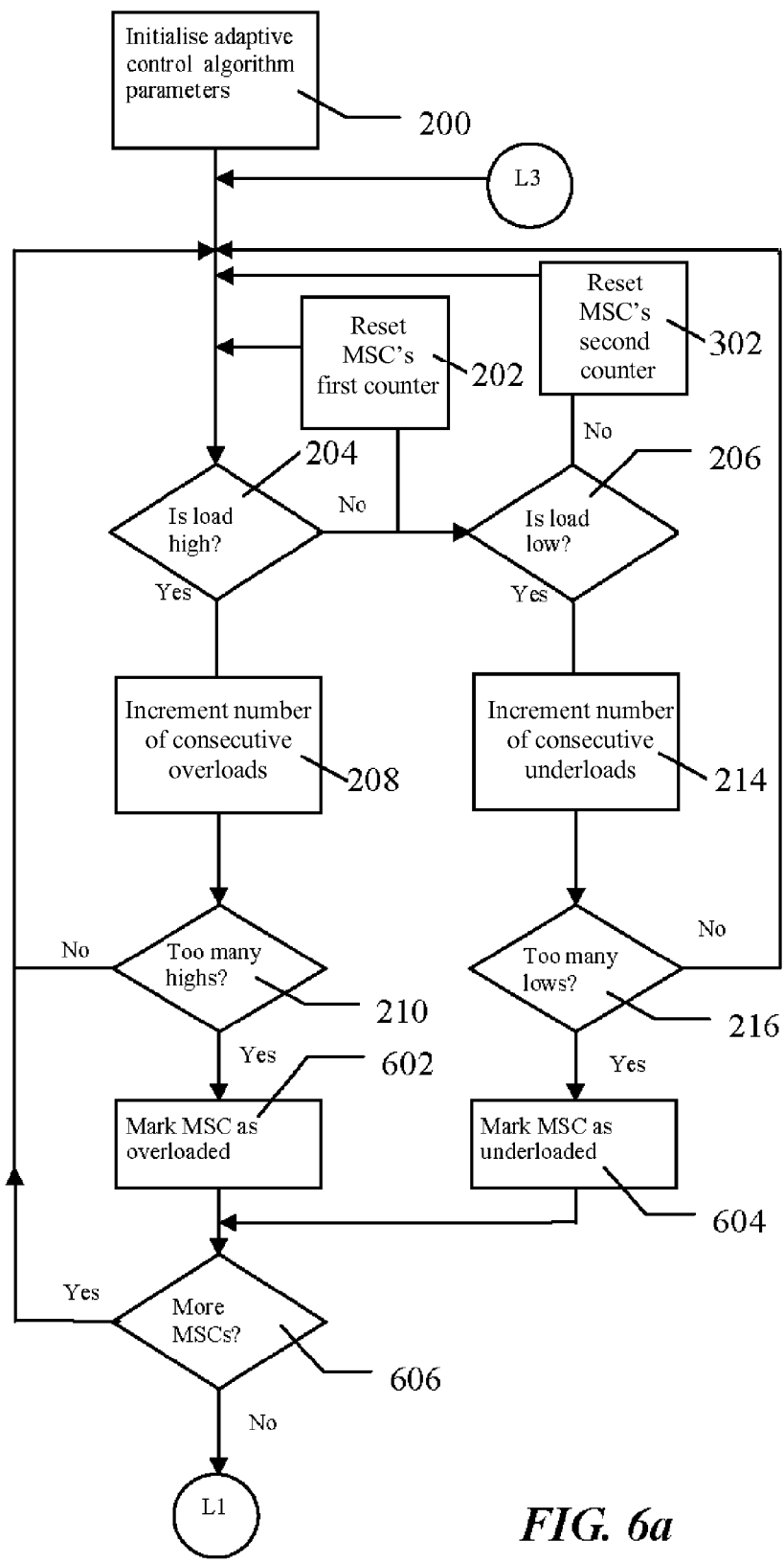
FIG. 6a and FIG. 6b show flowcharts illustrating a method of balancing load of an individual network element in an alternative embodiment of the present invention.
Figure 6B:
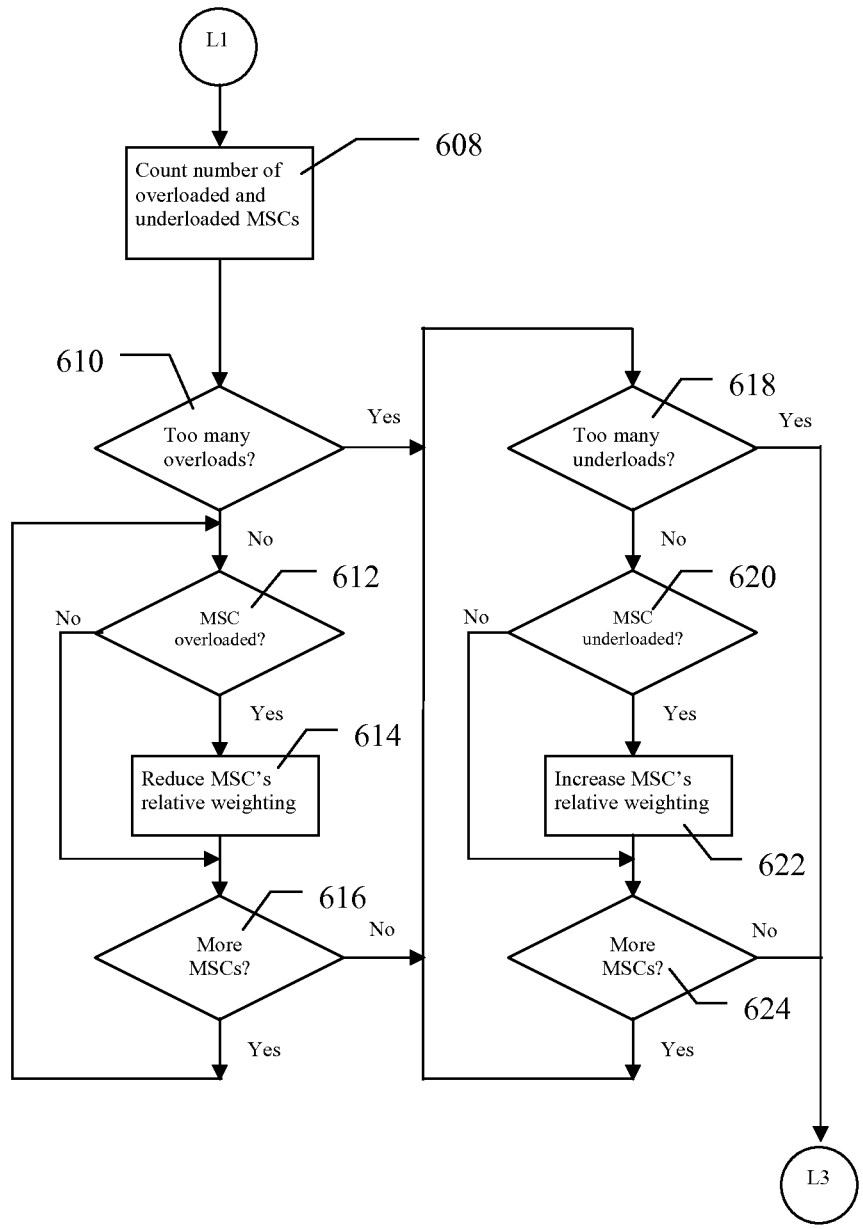

In yet another alternative embodiment of the present invention as illustrated in FIG. 6a and FIG. 6b before the relative weighting of an individual network element is changed (reduced or increased) it is checked if such a change will provide expected benefit to the pool. If all network elements in a pool are overloaded or at least their load is very close to being overloaded reduction of relative weighting will result only in transferring load between highly loaded network elements. Similarly with underloaded network element it is checked if the increase will provide some benefit to the pool. Therefore the relative weighting value of the overloaded network element is decreased if there is at least one network element in the pool, which can accommodate load from said overloaded network element 610. Similarly the relative weighting value of the underloaded network element is increased if there is at least one network element in the pool, which is not underloaded 618.

In operation, network elements for which the number of consecutive overloads exceeded a limit of allowed consecutive overloads are marked 602 as overloaded network elements and network elements for which the number of consecutive underloads exceeded a limit of allowed consecutive underloads are marked 604 as underloaded network elements.

The operation of determining the load and marking network elements as overloaded and underloaded is carried out for each network element in the pool, 606.

Figure 7:
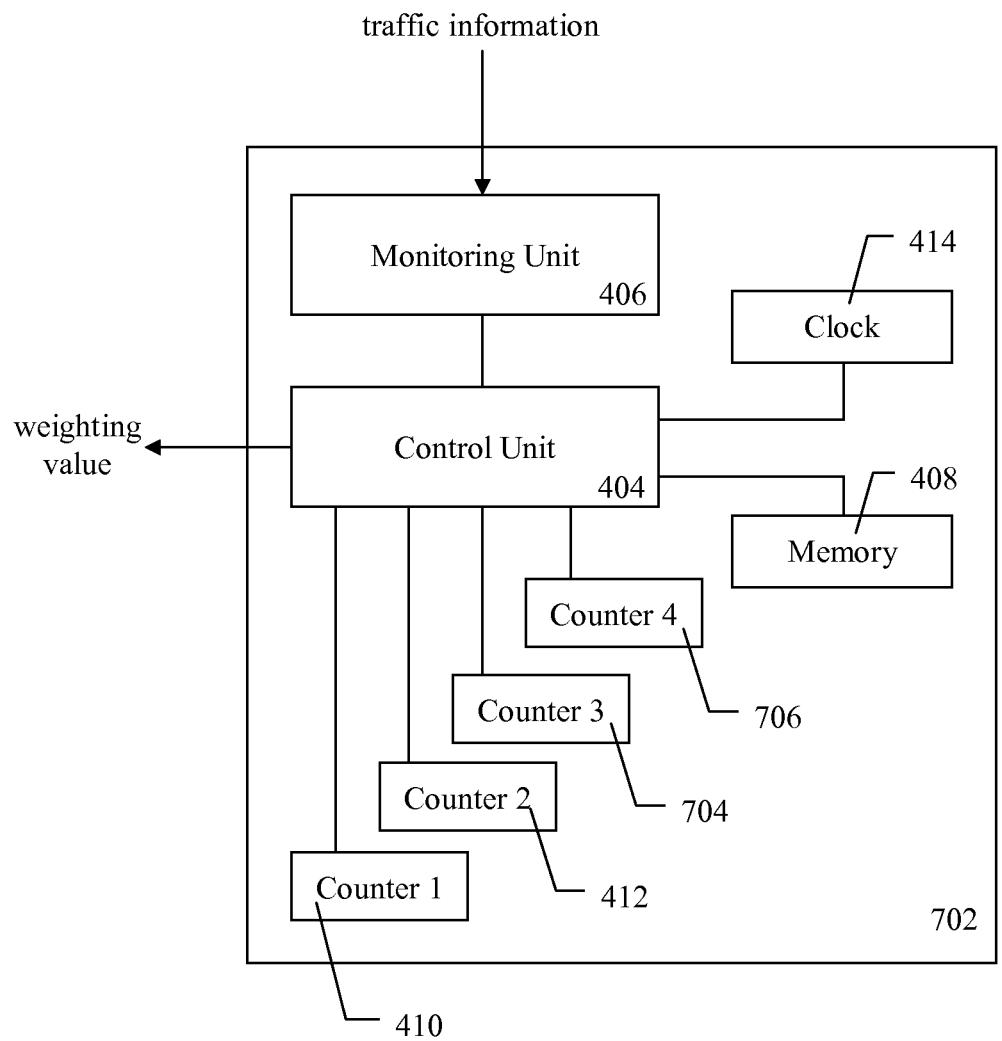
FIG. 7 is a diagram illustrating a network element in an alternative embodiment of the present invention.

The number of overloaded and underloaded network elements in the pool is counted, 608. Once a network element 702, as illustrated in FIG. 7, determines its load said network element transmits the load figure to other network elements in its pool. This is performed by all network elements in the pool and as a result each individual network element has information about load of all other network elements in its pool. Additionally two predefined values are maintained in the memory 408 of each network element in the pool: a third limit and a fourth limit, wherein the relative weighting of an overloaded network element is decreased 614 if the number of overloaded network elements is below the third limit 610. In this way it is checked if there is not too many other overloaded network elements in the pool. Once this is confirmed, the relative weighting of every, 616, overloaded network element in the pool is reduced 612, 614. Similarly, the relative weighting of every, 624, underloaded network element in the pool, 620, is increased, 622, if the number of underloaded network elements is below the fourth limit 618.

In a preferred embodiment control parameters are provided to specify the maximum allowed percentage of MSCs in a pool which may be overloaded or underloaded before adjustment of the relative weighting.

In operation, each MSC operating in a pool runs an algorithm that implements the method according to embodiments of the present invention. To initialize the algorithm the user must specify the following parameters:

I—the interval between measurement of MSC load in minutes, value range 1-60

$L_u$—the upper limit on traffic load on an overloaded MSC which triggers load rebalancing (specified in %)

$L_l$—the lower limit on traffic load on an underloaded MSC which triggers load rebalancing (specified in %)

$D_u$—the delta by which the relative weighting of an overloaded MSC shall be reduced $D_l$—the delta by which the relative weighting of an underloaded MSC shall be increase $T_u$—the number of times the upper limit on traffic load is exceeded for a given MSC to be considered to be overloaded $T_l$—the number of times the lower limit on traffic load is exceeded for a given MSC to be considered to be overloaded $N_o$—the maximum number of MSCs which can be overloaded without preventing the relative weighting of an MSC from being reduced (specified in %)

$N_u$—the maximum number of MSCs which can be underloaded without preventing the relative weighting of an MSC from being increased (specified in %)
$W_u(x)$—the maximum weighting value which can be assigned to $MSC_X$
$W_l(x)$—the minimum weighting value which can be assigned to $MSC_X$ The following variables are used:
load(x)—the traffic load in % for $MSC_x$
timesOver(x)—the number of consecutive occasions when $MSC_x$ has been overloaded
timesUnder(x)—the number of consecutive occasions when $MSC_x$ has been underloaded
overloaded(x)—the overload status of $MSC_x$ (specified as a boolean)
underloaded(x)—the underload status of $MSC_x$ (specified as a boolean)
numOverLoaded—the number of overloaded MSCs
numUnderLoaded—the number of underloaded MSCs
n—the number of MSCs in the pool In one embodiment of the present invention the algorithm to control the adaptive load balancing is illustrated in the following pseudo-code:

```
/* Initialise MSC status */
Initialise timesOver(x) and timesUnder(x) for all MSCs to 0.
Initialise overLoaded(x) and underLoaded (x) for all MSCs to false
/* Detect if MSCs are overloaded or underloaded */
Repeat until user termination
    TimerExpire) When timer expires reset to I
        For each MSC:
            If (load(x) > L_u)
                set timesOver(x) = timesOver(x) + 1
                set timesUnder(x) = 0
                set underLoaded(x) = false
                If (timesOver(x) >= T_u)
                    set overLoaded(x) = true
                Endif
            Else
                set timesOver(x) = 0
                set overLoaded(x) = false
                If (load(x) < L_l)
                    set timesUnder(x) = timesUnder(x) + 1
                    If (timesUnder(x) >= T_l)
                        set underLoaded(x) = true
                    Endif
                Else
                    Set timesUnder(x) = 0
                    Set underLoaded(x) = false
                Endif
            Endif
        End for
        /* Count the number of overloaded and underloaded MSCs */
    Initialise numOverLoaded = 0
    Initialise numUnderLoaded =0
    For each MSC
        If overloaded(x) = true
            Set numOverLoaded = numOverLoaded + 1
        Else if underloaded(x) = true
            Set numUnderLoaded = numUnderLoaded + 1
        Endif
    End for
    /* If the number of overloaded MSCs is within the allowed limit
            reduce the weighting value for each overloaded MSC */
    If (numOverLoaded * 100) / n <= N_o
        For each MSC
            If (overLoaded(x) = true)
                Set W(x) = maximum of(W(x) – D_u, W_l (x))
                Set overLoaded(x) = false
                Set timesOver(x) = 0
            Endif
        End for
    Endif
    /* If the number of underloaded MSCs is within the allowed limit
            increase the weighting value for each underloaded MSC */
    If (numUnderLoaded * 100) / n <= N_u
        For each MSC
            If (underLoaded(x) = true)
                Set W(x) = minimum of (W(x) + D_l, W_u (x))
                Set underloaded(x) = false
                Set timesUnder(x) = 0
            Endif
        End for
    Endif
    /* Wait for timer to expire to begin checking MSC load again */
    Go to TimerExpire
```

With reference to FIG. 7 a further preferred embodiment of a MSC, 702 in accordance with the present invention is presented. For the sake of clarity, remaining elements of the MSC not essential for the invention are omitted in the drawing.

In addition to the embodiment presented in FIG. 5 the MSC, 702, in this embodiment comprises a third counter 704 and a fourth counter 706. The third counter 704 is for recording number of overloaded network elements in the pool and the fourth counter 706 is for recording number of underloaded network elements in the pool. These data are used to determine whether to change the relative weighting value of an individual network element in the pool 708, 710, 718.

Figure 8:
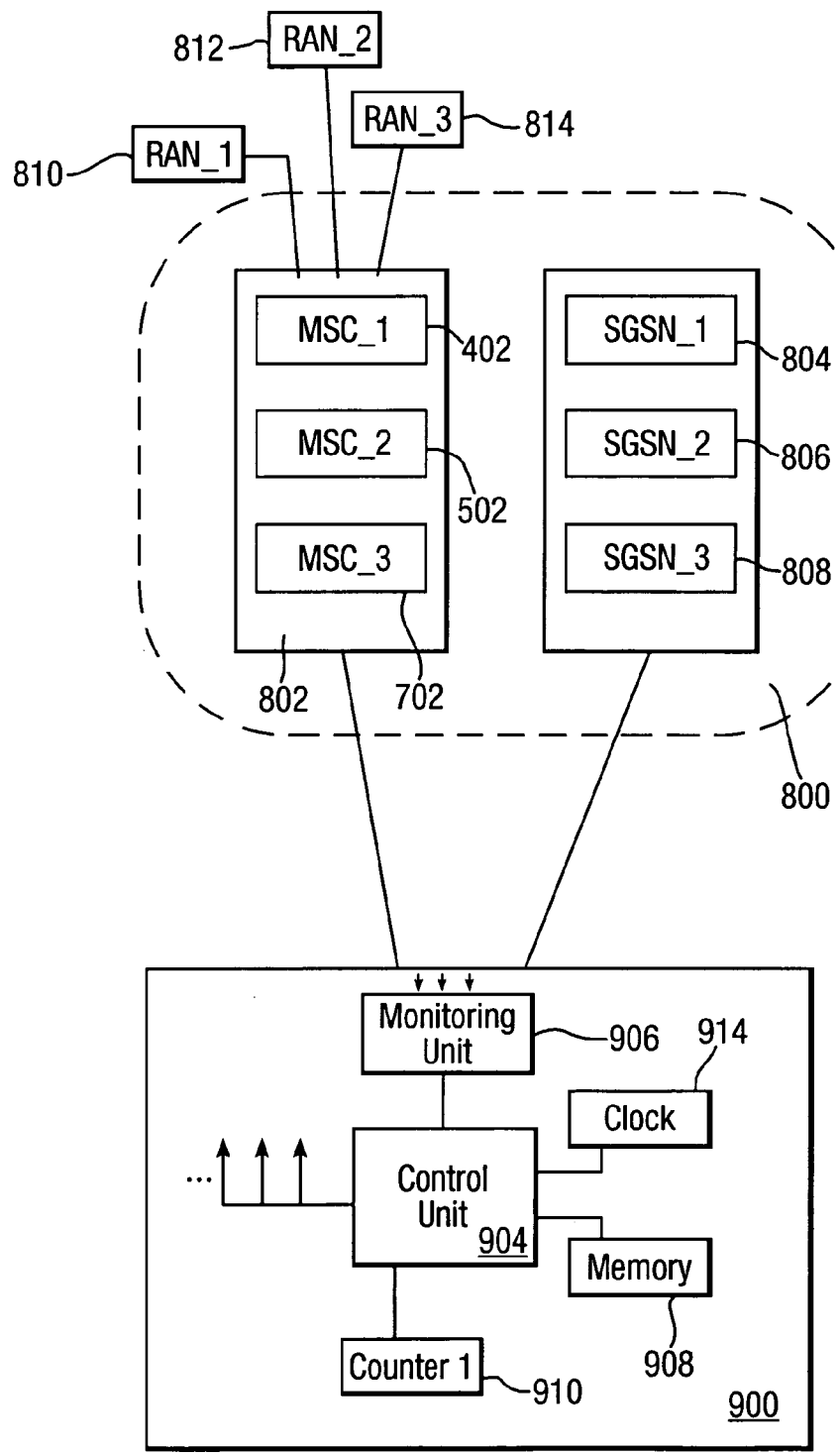
FIG. 8 is a diagram illustration a network and a network management system in one embodiment of the present invention.

FIG. 8 illustrates one embodiment of a network management system 900, which controls a core network 800. Said core network 800 comprises a plurality of network elements, 402, 502, 702, operating in a pool 802. There are two pools illustrated in FIG. 8. One pool 802 comprises three MSCs 402, 502 and 702. Another pool comprises three SGSNs, 804, 806, 808. Different numbers of network elements in a pool are of course also possible. An individual network element 402, 502, 702 from the pool 802 controls a plurality of Radio Access Network nodes 810, 812, 814 and has associated a relative weighting value stored in said network management system. The network management system 900 comprises monitoring unit 906 which periodically determines traffic load of individual network elements, a memory unit 908 and a control unit 904 for comparing the traffic load of said individual network element with an upper limit stored in said memory 908. A first counter 910 records number of consecutive occasions of exceeding the upper limit and said control unit 904 reduces the relative weighting value of said individual network element if said network element is overloaded for a number of periods exceeding the limit of allowed consecutive overloads.

In an alternative embodiments the network management system comprises more counters in order to more effectively distribute the load. A second counter is for controlling underload of network elements. Preferably a third and a fourth counters are also comprised in said network management system and they allow for determining if changing the relative weighting value of a network element will provide expected benefit to the pool.

The method in various embodiments of the present invention can be implemented equally in network elements of a pool as well as in a network management system.

The invention claimed is:

1. A method of balancing load of an individual network element operating in a pool in a core network comprising at least one pool of at least two network elements and a plurality of Radio Access Network nodes controlled by said network elements, wherein a user equipment is assigned to a network element from said pool of network elements based on relative weighting values associated with said network elements and the method comprises:
    periodically determining load of said network element; and
    reducing the relative weighting value if said network element is overloaded for a number of periods exceeding a limit of allowed consecutive overloads.

2. The method according to claim 1 further comprising increasing the relative weighting value if said network element is underloaded for a number of periods exceeding a limit of allowed consecutive underloads.

3. The method according to claim 1, comprising the steps of:
    comparing the load with an upper limit;
    incrementing a first counter if the upper limit is exceeded and erasing said first counter otherwise;
    comparing the first counter with said limit of allowed consecutive overloads; and
    reducing the relative weighting value if said limit of allowed consecutive overloads is exceeded.

4. The method according to claim 2, comprising the steps of:
    comparing the traffic load with a lower limit;
    incrementing a second counter if the traffic load is below the lower limit and erasing said second counter otherwise;
    comparing the second counter with said limit of allowed consecutive underloads; and increasing the relative weighting value if said limit of allowed consecutive underloads is exceeded.

5. The method according to claim 2, wherein the relative weighting value of the network element overloaded for a number of periods exceeding said limit of allowed consecutive overloads is decreased if there is at least one network element in the pool, which can accommodate load from said network element and the relative weighting value of the network element underloaded for a number of periods exceeding said limit of allowed consecutive underloads is increased if there is at least one network element in the pool, which is not underloaded.

6. The method according to claim 2, further comprising marking network elements for which the number of consecutive overloads exceeded said limit of allowed consecutive overloads as overloaded network elements and marking network elements for which the number of consecutive underloads exceeded said limit of allowed consecutive underloads as underloaded network elements, wherein the relative weighting of an overloaded network element is decreased if the number of network elements marked as overloaded in said pool is below a third limit and the relative weighting of an underloaded network element is increased if the number of network elements marked as underloaded in said pool is below a fourth limit.

7. The method according to claim 6, comprising the steps of:
    comparing the load with an upper limit;
    incrementing a first counter if the upper limit is exceeded and erasing said first counter otherwise;
    comparing the first counter with said limit of allowed consecutive overloads; and
    marking the network element as overloaded if said limit of allowed consecutive overloads is exceeded.

8. The method according to claim 6, comprising the steps of:
    comparing the traffic load with a lower limit;
    incrementing a second counter if the traffic load is below the lower limit and erasing said second counter otherwise;
    comparing the second counter with said limit of allowed consecutive underloads; and
    marking the network element as underloaded if said limit of allowed consecutive underloads is exceeded.

9. The method according to claim 1, wherein the network element is a Mobile Switching Centre or a Serving GPRS Support Node.

10. The method according to claim 1, wherein the Radio Access Node is a Radio Base Station or a Radio Network Controller.

11. The method according to claim 6, wherein the third and fourth limits are determined as a percentage of the total number of network elements in the pool.

12. A network element operating in a pool of at least two network elements in a core network, said network element is adapted to control a plurality of Radio Access Network nodes and has associated a relative weighting value; the network element comprises means for periodic determining its traffic load, a memory unit, a control unit for comparing the traffic load with an upper limit stored in said memory, a first counter for recording number of consecutive occasions of exceeding the upper limit, wherein said control unit is adapted to reduce the relative weighting value if said network element is overloaded for a number of periods exceeding a limit of allowed consecutive overloads.

13. The network element according to claim 12, further comprising a second counter and said memory is adapted to store a lower limit, wherein the control unit is adapted to compare the traffic load with said lower limit stored in said memory and said second counter is adapted to record number of consecutive occasions of the traffic load being below the lower limit, wherein said control unit is adapted to increase the relative weighting value if said network element is underloaded for a number of periods exceeding a limit of allowed consecutive underloads.

14. The network element according to claim 12, adapted to transmit its load figure to other network elements in its pool and to receive load figures from other network elements in its pool.

15. The network element according to claim 12, further comprising a third counter for recording number of network elements in the pool which are overloaded for a number of periods exceeding said limit of allowed consecutive overloads and a fourth counter for recording number of network elements in the pool which are underloaded for a number of periods exceeding said limit of allowed consecutive underloads.

16. The network element according to claim 15, wherein the control unit is adapted to decrease the relative weighting value of said network element if the value of the third counter is below a third limit and to increase the relative weighting value of said network element if the value of the fourth counter is below a fourth limit.

17. The network element according to claim 12, wherein said network element is a Mobile Switching Centre or a Serving GPRS Support Node.

18. A core network controlling radio telecommunications network comprising at least one pool of at least two network elements controlling a plurality of Radio Access Network nodes, wherein a user equipment is assigned to a network element from said pool of network elements based on relative weighting values associated with said network elements, and wherein balancing load of an individual network element operating in the pool is carried out by means for performing:
periodically determining load of said network element; and
reducing the relative weighting value if said network element is overloaded for a number of periods exceeding a limit of allowed consecutive overloads.

19. A network management system controlling a core network, said core network comprising a plurality of network elements operating in a pool of at least two network elements, wherein an individual network element is adapted to control a plurality of Radio Access Network nodes and has associated a relative weighting value stored in said network management system; the network management system comprises means for periodic determining traffic load of individual network elements, a memory unit, a control unit for comparing the traffic load of said individual network element with an upper limit stored in said memory, a first counter for recording number of consecutive occasions of exceeding the upper limit, wherein said control unit is adapted to reduce the relative weighting value if said network element is overloaded for a number of periods exceeding a limit of allowed consecutive overloads.

20. The network management system according to claim 19, further comprising a second counter and said memory is adapted to store a lower limit, wherein the control unit is adapted to compare the traffic load with said lower limit stored in said memory and said second counter is adapted to record number of consecutive occasions of the traffic load being below the lower limit, wherein said control unit is adapted to increase the relative weighting value if said network element is underloaded for a number of periods exceeding a limit of allowed consecutive underloads.

21. The network management system according to claim 19 further comprising a third counter for recording number of overloaded network elements in the pool and a fourth counter for recording number of underloaded network elements in the pool.

22. The network management system according to claim 21, wherein the control unit is adapted to decrease the relative weighting value of said network element if the value of the third counter is below a third limit and to increase the relative weighting value of said network element if the value of the fourth counter is below a fourth limit.

* * * * *